United States Patent
Lan et al.

(10) Patent No.: US 10,216,446 B2
(45) Date of Patent: Feb. 26, 2019

(54) METHOD FOR DEDUPLICATION IN STORAGE SYSTEM, STORAGE SYSTEM, AND CONTROLLER

(71) Applicant: HUAWEI TECHNOLOGIES CO., LTD., Shenzhen, Guangdong (CN)

(72) Inventors: Wenhai Lan, Shenzhen (CN); Wei Zhang, Shenzhen (CN); Xiaoan Yu, Shenzhen (CN); Xuyou Liu, Shenzhen (CN); Zhixiong Zhang, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/960,546

(22) Filed: Apr. 23, 2018

(65) Prior Publication Data

US 2018/0239553 A1    Aug. 23, 2018

Related U.S. Application Data

(63) Continuation of application No. PCT/CN2016/100629, filed on Sep. 28, 2016.

(51) Int. Cl.
*G06F 3/06* (2006.01)
*G06F 12/1009* (2016.01)
(Continued)

(52) U.S. Cl.
CPC ............ *G06F 3/0641* (2013.01); *G06F 3/061* (2013.01); *G06F 3/0608* (2013.01);
(Continued)

(58) Field of Classification Search
CPC ...... G06F 3/0641; G06F 3/0608; G06F 3/061; G06F 3/0644; G06F 17/30156;
(Continued)

(56) References Cited

U.S. PATENT DOCUMENTS 9,424,285 B1 *  8/2016  Condict .................... G06F 3/06
2014/0281361 A1  9/2014  Park et al.
(Continued)

FOREIGN PATENT DOCUMENTS

| CN | 104246774 A | 12/2014 |
| CN | 105607867 A | 5/2016 |
| CN | 105701024 A | 6/2016 |

OTHER PUBLICATIONS

"Next-Generation Data Platform for Hyperconvergence", White Paper, Cisco and/or its affiliates., Mar. 2016, total 12 pages.
Wei Zhang et al., "Low-Cost Data Deduplication for Virtual Machine Backup in Cloud Storage", 2013, total 5 pages.
Ahmed El-Shimi et al., "Primary Data Deduplication—Large Scale Study and System Design", 2012, total 12 pages.

*Primary Examiner* — Hiep T Nguyen
(74) *Attorney, Agent, or Firm* — Womble Bond Dickinson (US) LLP (57) ABSTRACT

A solution to deduplication in a storage system is disclosed herein. In this solution, a controller stores, at a first storage address, a data block that is written for the first time, and inserts, in a fingerprint table, a first fingerprint of first data that is written for the first time, but does not establish a mapping relationship between the first fingerprint and the first storage address. When receiving subsequently written second data to be written, the controller allocates a second storage address to the duplicate second data, stores the second data at the second storage address, and establishes a mapping relationship between the first fingerprint and the second storage address in the fingerprint table. This reduces an amount of data in the fingerprint table.

21 Claims, 6 Drawing Sheets

(51) Int. Cl.
*G06F 11/14* (2006.01)
*G06F 17/30* (2006.01)

(52) U.S. Cl.
CPC ........ *G06F 3/0673* (2013.01); *G06F 11/1453* (2013.01); *G06F 12/1009* (2013.01); *G06F 17/30156* (2013.01); *G06F 17/30371* (2013.01); *G06F 2212/1044* (2013.01); *G06F 2212/657* (2013.01)

(58) Field of Classification Search
CPC ......... G06F 17/30159; G06F 17/30097; G06F 17/30303; G06F 17/3033; G06F 17/3015; G06F 11/1453; G06F 12/0246; G06F 3/0673; G06F 12/1009; G06F 17/30371; G06F 2212/1044; G06F 2212/657
See application file for complete search history.

(56) References Cited

U.S. PATENT DOCUMENTS

| | | |
|---|---|---|
| 2016/0092138 A1 | 3/2016 | Knestele et al. |
| 2016/0139817 A1* | 5/2016 | Harijono ............... G06F 3/0608 711/154 |
| 2017/0094349 A1* | 3/2017 | Maughan ......... H04N 21/44204 |
| 2017/0115883 A1* | 4/2017 | Muppalaneni ...... G06F 12/1009 |
| 2017/0308320 A1* | 10/2017 | Sharma ................. G06F 3/0605 |
| 2017/0329815 A1 | 11/2017 | Fiske et al. |

* cited by examiner

| LBA | Storage address | Referenceable data or not |
|---|---|---|
| LBA 1 | SD 1 | 0 |

FIG. 4

| Fingerprint | Storage address | Reference count | Insertion time |
|---|---|---|---|
| Fingerprint A | | 0 | T1 |

FIG. 5

| LBA | Storage address | Referenceable data or not |
|---|---|---|
| LBA 1 | SD 1 | 0 |
| LBA 2 | SD 2 | 1 |

FIG. 6

| Fingerprint | Storage address | Reference count | Insertion time |
|---|---|---|---|
| Fingerprint A | SD 2 | 1 | T1 |

FIG. 7

| LBA | Storage address | Referenceable data or not |
|---|---|---|
| LBA 1 | SD 1 | 0 |
| LBA 2 | SD 2 | 1 |
| LBA 3 | SD 2 | 1 |

FIG. 8

| Fingerprint | Storage address | Reference count | Insertion time |
|---|---|---|---|
| Fingerprint A | SD 2 | 2 | T1 |

FIG. 9

| Storage address | Logical address |
|---|---|
| SD 2 | LBA 2, LBA 3 |

FIG. 10

| Fingerprint | Storage address | Reference count | Insertion time |
|---|---|---|---|
| Fingerprint B | SD 3 | 1 | T2 |

FIG. 11

| LBA | Storage address | Referenceable data or not |
|---|---|---|
| LBA 1 | SD 3 | 1 |

METHOD FOR DEDUPLICATION IN STORAGE SYSTEM, STORAGE SYSTEM, AND CONTROLLER

CROSS-REFERENCE TO RELATED APPLICATIONS

This application is a continuation of International Application No. PCT/CN2016/100629, filed on Sep. 28, 2016, which is hereby incorporated by reference in its entirety.

TECHNICAL FIELD

The present invention relates to the field of information technologies, and in particular, to a method for deduplication in a storage system, a storage system, and a controller.

BACKGROUND

A deduplication function is an important characteristic in a storage system. After the deduplication function is introduced into the storage system, storage of duplicate data can be reduced, and storage space is therefore saved.

In the prior art, a deduplication operation generally includes the following process:

A fingerprint of a data block is obtained; a fingerprint table is queried to determine whether the fingerprint table includes the same fingerprint; if the fingerprint table does not include the fingerprint, a storage address is allocated in a storage area, and the data block is stored at the storage address; and a mapping relationship between the fingerprint and the storage address and a mapping relationship between a logical block address of the data block and the fingerprint are established in the fingerprint table. When a data block with the same fingerprint is repeatedly written, only a mapping relationship between a logical block address of the repeatedly written data block and the fingerprint needs to be established, and there is no need to store the repeatedly written data block again. By using a deduplication technology in the prior art, storage space is saved; however, there is a problem of a large amount of data in a fingerprint table.

SUMMARY

According to a first aspect, an embodiment of the present invention provides a solution to deduplication in a storage system, and the storage system includes a controller and a storage device. The solution includes: receiving, by the controller, a first write request, where the first write request includes a first logical block address and first data to be written; obtaining, by the controller, a first fingerprint of the first data; inserting the first fingerprint into a fingerprint table when the fingerprint table does not include the first fingerprint, and allocating a first storage address from the storage device to the first data; storing, by the controller, the first data at the first storage address; establishing, by the controller, a mapping relationship between the first logical block address and the first storage address; receiving, by the controller, a second write request, where the second write request includes a second logical block address and second data to be written; obtaining, by the controller, a fingerprint of the second data, where the fingerprint of the second data is identical to the first fingerprint; allocating, by the controller, a second storage address from the storage device to the second data when the controller queries the fingerprint table according to the first fingerprint of the second data and determines that no storage address corresponding to the first fingerprint exists; storing, by the controller, the second data at the second storage address; establishing, by the controller, a mapping relationship between the first fingerprint and the second storage address in the fingerprint table; and establishing, by the controller, a mapping relationship between the second logical block address and the second storage address.

Generally, in deduplication, a fingerprint table is also referred to as a fingerprint index or fingerprint metadata, and is used to store a mapping relationship between a fingerprint and a storage address corresponding to the fingerprint. A data block corresponding to the fingerprint is stored at the storage address.

When the foregoing solution is implemented, a fingerprint entry in the fingerprint table may be used to store the mapping relationship between a fingerprint and a storage address corresponding to the fingerprint. A process of the inserting the first fingerprint into the fingerprint table when the fingerprint table does not include the first fingerprint includes: creating, by the controller, a first fingerprint entry in the fingerprint table when no fingerprint entry in the fingerprint table includes the first fingerprint, and inserting the first fingerprint into the first fingerprint entry. A process in which the controller queries the fingerprint table according to the first fingerprint of the second data to determine that no storage address corresponding to the first fingerprint exists specifically includes: querying, by the controller, the fingerprint table according to the first fingerprint of the second data to determine that the first fingerprint corresponds to no storage address in the first fingerprint entry. A process of the establishing, by the controller, a mapping relationship between the first fingerprint and the second storage address in the fingerprint table is: inserting, by the controller, the second storage address into the first fingerprint entry.

In one embodiment, that no storage address corresponding to the first fingerprint exists in the fingerprint table may be referred to: no storage address corresponding to the first fingerprint is defined in the fingerprint table or the first fingerprint corresponds to no storage address. In an implementation of using a fingerprint entry to record a mapping relationship between a fingerprint and a storage address in a fingerprint table, when no fingerprint entry in the fingerprint table includes the first fingerprint, the controller creates the first fingerprint entry in the fingerprint table; when the first fingerprint is inserted into the first fingerprint entry, a storage address may not be defined in the first fingerprint entry, that is, a storage address parameter may not be defined in the first fingerprint entry, or there is no storage address, that is, a storage address parameter is defined with Null. These cases indicate that no storage address corresponding to the first fingerprint exists in the fingerprint table, that is, a mapping relationship between the first fingerprint and the first storage address is not established in the fingerprint table.

In one embodiment, the fingerprints of the first data and the second data are both identical to the first fingerprint, it indicates that the first data is the same as the second data. The controller stores a data block that is written for the first time at the first storage address and inserts, into the fingerprint table, the first fingerprint of the first data that is written for the first time, but does not establish the mapping relationship between the first fingerprint and the first storage address. When receiving the subsequently written second data (the second data is not limited to same data received by the controller for the second time), the controller allocates the second storage address to the duplicate second data, stores the second data at the second storage address, and establishes the mapping relationship between the first fingerprint and the second storage address in the fingerprint table. That is, the controller performs deduplication only on same data that has been received for multiple times (twice at least), and this reduces an amount of data in the fingerprint table.

Optionally, the controller counts a quantity of times that a received write request carries data whose fingerprint value is the first fingerprint. the controller stores the second data at the second storage address, and establishes the mapping relationship between the first fingerprint and the second storage address in the fingerprint table when the quantity of times is greater than a preset quantity N of times, where N is an integer not less than 1. That is, duplicate data (the second data) appearing for the $(N+1)^{th}$ time is stored at the second storage address, and the mapping relationship between the first fingerprint and the second storage address is established in the fingerprint table. Data stored in the second storage address is referenceable data. Therefore, deduplication on a data block whose duplication degree reaches a specific value may be set according to a requirement of the storage system. Referenceable data is data that is stored at a storage address corresponding to a fingerprint in the fingerprint table, and non-referenceable data is data that is stored in the storage system but that is not stored at a storage address corresponding to a fingerprint in the fingerprint table.

Optionally, the controller allocates the first storage address from a first storage area of the storage device to the first data, and the controller allocates the second storage address from a second storage area of the storage device to the second data, where storage performance of the second storage area is higher than storage performance of the first storage area, and performance of the controller in accessing referenceable data can be improved.

Optionally, the controller receives a third write request, where the third write request includes a third logical block address and third data to be written; the controller obtains a fingerprint of the third data, where the fingerprint of the third data is the first fingerprint; and when querying the fingerprint table according to the first fingerprint of the third data to determine that a storage address corresponding to the first fingerprint is the second storage address, the controller establishes a mapping relationship between the third logical block address and the second storage address. When fingerprints of the first data, the second data, and the third data are identical to the first fingerprint, it indicates that the first data, the second data, and the third data are the same. Based on this, the controller performs a deduplication operation on duplicate data, and storage space can be saved. In a specific implementation, when querying the first fingerprint entry in the fingerprint table according to the first fingerprint of the third data to determine that the storage address corresponding to the first fingerprint is the second storage address, the controller establishes the mapping relationship between the third logical block address and the second storage address.

Optionally, the controller records a quantity of reference times of the second storage address in the fingerprint table. A quantity of reference times is a quantity of times that a logical block address references a storage address corresponding to a fingerprint in the fingerprint table. The quantity of times that a logical block address references a storage address corresponding to a fingerprint in the fingerprint table is determined by a mapping relationship between the logical block address and the storage address. When the controller establishes a mapping relationship between the logical block address and the storage address, and the storage address is recorded in the fingerprint table, the logical block address references the storage address corresponding to the fingerprint in the fingerprint table once. In a specific implementation, the controller records the quantity of reference times of the second storage address in the first fingerprint entry in the fingerprint table. In this implementation, the quantity of reference times is a quantity of times that the logical block address references a storage address in the fingerprint entry. It may be determined, according to the quantity of reference times, whether data can be written at the second storage address again. When the quantity of reference times is 0, it indicates that no logical block address points to the second storage address, and the second storage address may be released, so that the second storage address becomes an idle storage address in the storage device and may be used for writing data again.

Optionally, the controller stores, in a cache of the controller according to a quantity of reference times recorded in the fingerprint table, a mapping relationship between a fingerprint whose quantity of reference times is greater than a preset threshold and a storage address corresponding to the fingerprint, and this improves fingerprint search efficiency during deduplication. Specifically, the controller may implement this operation according to a quantity of reference times recorded in a fingerprint entry in the fingerprint table. Optionally, the controller records, in the fingerprint table, time when the first fingerprint is inserted. Specifically, the time when the first fingerprint is inserted may be recorded in the first fingerprint entry in the fingerprint table.

Optionally, the controller deletes a second fingerprint from the fingerprint table. No storage address corresponding to the second fingerprint exists in the fingerprint table, and duration for which the second fingerprint has been inserted into the fingerprint table exceeds a preset duration. The controller may delete, from the fingerprint table, a fingerprint that exists in the fingerprint table for duration exceeding preset duration and that corresponds to no storage address, and this further reduces the amount of the data in the fingerprint table. In a specific implementation, it may be determined, according to time when the second fingerprint is inserted and that is recorded in the fingerprint table, that the duration for which the second fingerprint exists in the fingerprint table exceeds the preset duration. Optionally, a fingerprint entry is used as an example. For the second fingerprint recorded in a fingerprint entry by the controller, the second fingerprint corresponds to no storage address in a second fingerprint entry, and duration for which the second fingerprint exists in the second fingerprint entry exceeds the preset duration. For a meaning that no storage address corresponding to a fingerprint exists, refer to the foregoing description, and details are not described herein again.

Optionally, the storage system may further include an inverse mapping table. An entry in the inverse mapping table is used to record a mapping relationship between a storage address corresponding to a fingerprint in the fingerprint table and a logical block address pointing to the storage address. For the second storage address corresponding to the first fingerprint, logical block addresses pointing to the second storage address are respectively the second logical block address and the third logical block address. When the storage device providing the second storage address is faulty (or the second storage area is faulty), the faulty storage device is replaced with a new storage device (the faulty second storage area is replaced with a new storage area). Therefore, when the second storage address is reallocated from the new storage device or the new storage area, the second logical block address and the third logical block address that are corresponding to the second storage address only need to be determined according to an entry in the inverse mapping table, and there is no need to determine the logical block addresses pointing to the second storage address by traversing mapping relationships between logical block addresses of all logical units in the storage system and storage addresses. Therefore, logical block address search efficiency during data recovery is improved.

Optionally, a mapping relationship between a logical block address and a storage address may further include an identifier indicating whether data is referenceable data. For example, the mapping relationship between the first logical block address and the first storage address carries an identifier indicating whether the data is referenceable data, the mapping relationship between the second logical block address and the second storage address carries an identifier indicating whether the data is referenceable data, and the mapping relationship between the third logical block address and the second storage address carries an identifier indicating whether the data is referenceable data. The controller may easily identify whether the data stored at the storage addresses is referenceable data by using referenceable-data identifiers in the foregoing mapping relationships.

In the embodiments of the present invention, when performing deduplication, a controller establishes a mapping relationship between a logical block address and a storage address, instead of a mapping relationship between a logical block address and a fingerprint and a mapping relationship between a fingerprint and a storage address storing data corresponding to the fingerprint in the prior art.

Therefore, according to solutions provided in the embodiments of the present invention, the controller can still access data in a storage device, write data, and delete data from the storage device according to the mapping relationship between a logical block address and a storage address even when the controller does not perform deduplication. A case in which the controller does not perform deduplication includes: for example, deduplication logic of the controller is offline, and an entry in a fingerprint table cannot be accessed. Therefore, data accessibility of the storage system is improved.

According to a second aspect, correspondingly, an embodiment of the present invention further provides a storage system and a controller that are configured to implement various implementation solutions of the first aspect. The controller includes structural units for implementing the various implementation solutions of the first aspect in the embodiments of the present invention, or the controller includes an interface and a processor for separately executing the various implementation solutions of the first aspect in the embodiments of the present invention.

Correspondingly, the present invention further provides a non-volatile computer readable storage medium and a computer program product. When a memory of a controller provided in an embodiment of the present invention loads a computer instruction included in the non-volatile computer readable storage medium and the computer program product, and a central processing unit (CPU) of the controller executes the computer instruction, the storage device is enabled to separately execute the various possible implementation solutions of the first aspect in the embodiments of the present invention.

EMBODIMENTS OF THE PRESENT INVENTION

Figure 1:
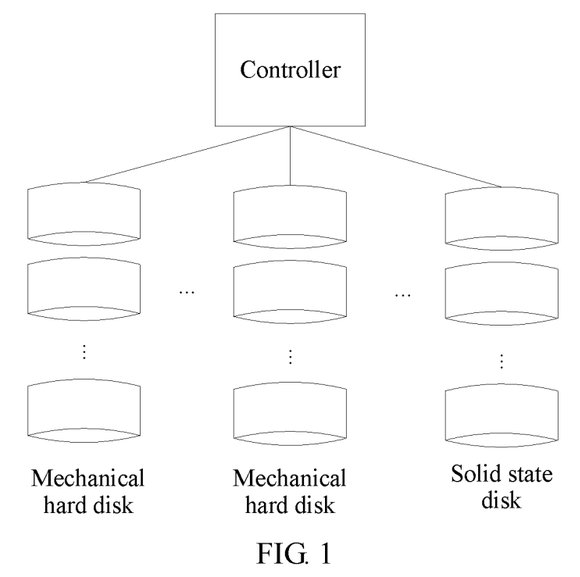
FIG. 1 is a schematic architectural diagram of a storage system according to an embodiment of the present invention.

As shown in FIG. 1, a storage system in an embodiment of the present invention includes a controller and a storage device, and the storage device is one or more hard disks. The hard disk includes a solid state disk (SSD) or a mechanical hard disk, or a combination of an SSD and a mechanical hard disk. The mechanical hard disk may be a hard disk drive (HDD) and the like.

Optionally, the hard disk in the storage device may be a hybrid (Hybrid) hard disk, or the storage device may be a single hard disk, such as a hard disk with an extremely large capacity.

Figure 2:
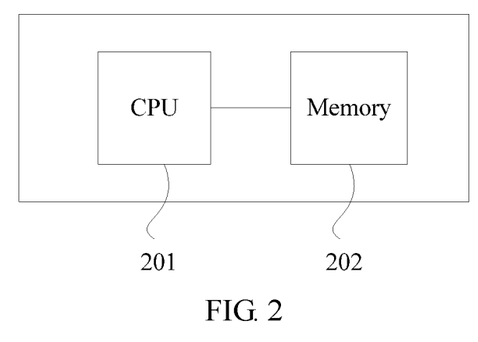
FIG. 2 is a schematic structural diagram of a controller according to an embodiment of the present invention.

As shown in FIG. 2, the controller includes a central processing unit (CPU) 201 and a memory 202. The memory 202 stores a computer instruction. The CPU 201 executes the computer instruction in the memory 202 to manage the storage system and perform a deduplication operation. In addition, to save computing resources of the CPU 201, a field programmable gate array (FPGA) or other hardware may also be used to execute all operations of the CPU in this embodiment of the present invention, or an FPGA or other hardware and the CPU are separately used to execute some operations of the CPU in this embodiment of the present invention, so as to implement a technical solution described in this embodiment of the present invention. For ease of description, a common description in this embodiment of the present invention is that the processor in the controller is configured to implement technical solutions in the embodiments of the present invention. The processor includes storage resource management logic and deduplication logic. The storage resource management logic is used to implement storage resource management and allocation and logical unit (LU) management. In this embodiment of the present invention, the logical unit is also referred to as a logical unit number (LUN). The deduplication logic is used to implement a deduplication operation. In addition, the controller further includes an interface. The interface communicates with the processor, and is configured to receive an operation request, such as a write request, a deletion request, or a read request. The interface may be specifically a host bus adapter (HBA) card, a Peripheral Component Interconnect Express (PCIe) interface card, or the like.

Figure 3:
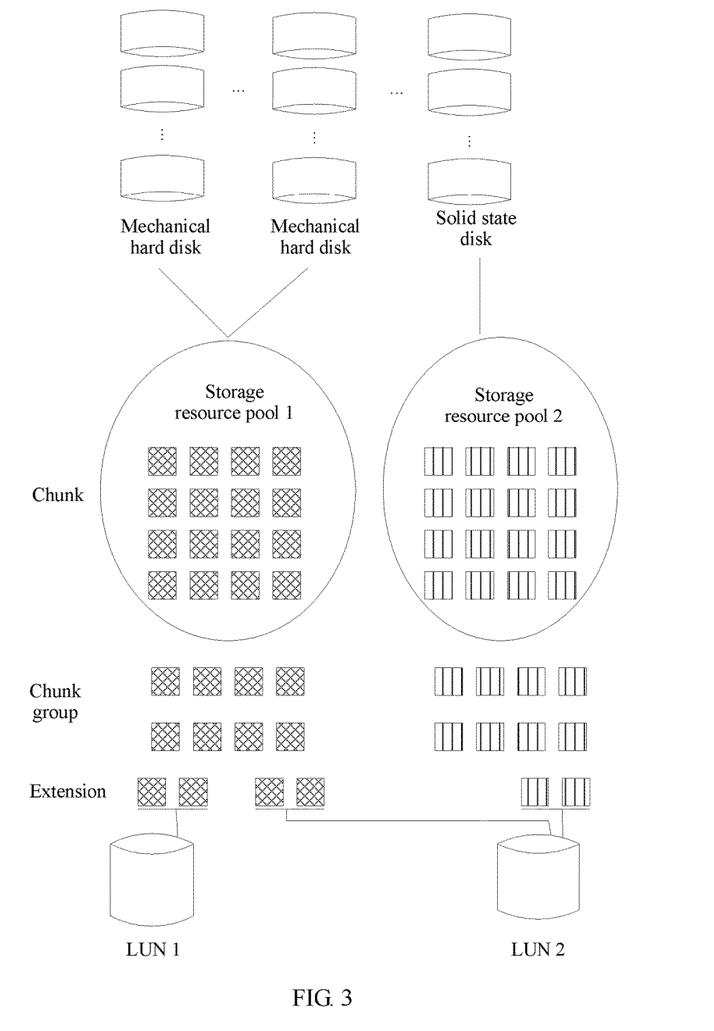
FIG. 3 is a schematic diagram of storage resource allocation in a storage system according to an embodiment of the present invention.

Because storage performance of an SSD is better than that of an HDD, in an implementation shown in FIG. 3, the controller separately divides the mechanical hard disk and the solid state disk in the storage system into fixed-size chunks, and the chunks form a storage area 1 and a storage area 2. In this embodiment of the present invention, a storage area is also referred to as a storage resource pool. The storage resource pool 1 includes chunks (▨) obtained by the controller by dividing the mechanical hard disk, and the storage resource pool 2 includes chunks (▥) obtained by the controller by dividing the solid state disk. Herein, the storage resource pool 2 is referred to as a first-level resource pool, and the storage resource pool 1 is referred to as a second-level resource pool. According to a redundant array of independent disks (RAID) algorithm, the controller randomly selects chunks distributed in multiple mechanical hard disks in the storage resource pool 1 to form a chunk group. For example, ▨▨▨▨ form a chunk group, that is, four ▨ respectively come from different hard disks. Likewise, according to the RAID algorithm, the controller randomly selects chunks distributed in multiple solid state disks in the storage resource pool 2 to form a chunk group. For example, ▥▥▥▥ form a chunk group, that is, four ▥ respectively come from different hard disks. The controller divides a chunk group into fixed-size extents such as ▨▨ or ▥▥, and allocates the extents to a LUN for use. As shown in FIG. 3, a LUN 1 uses an extent in the storage resource pool 1, and a LUN 2 uses extents in the storage resource pool 1 and the storage resource pool 2. That is, the LUN 1 uses the extent provided in the storage area 1, and the LUN 2 uses the extents provided in the storage area 1 and the storage area 2. Therefore, the LUN 1 is referred to as a non-hierarchical storage LUN, and the LUN 2 is referred to as a hierarchical storage LUN.

Figure 4:
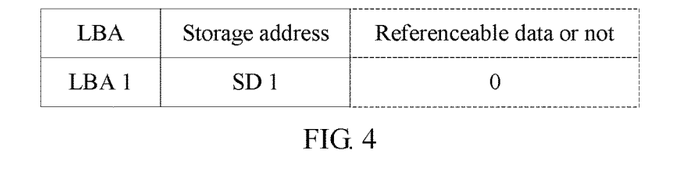
FIG. 4 is a schematic diagram of a mapping relationship between a logical block address and a storage address according to an embodiment of the present invention.

Using the LUN 2 as an example, the controller receives a first write request, and the first write request generally carries an identifier of the LUN 2, a logical block address (LBA) 1, and first data. The LBA 1 is a target logical block address of the first data. The controller obtains a fingerprint A of the first data, for example, obtains the fingerprint of the first data by using a hash algorithm. The controller queries a fingerprint table to determine whether the fingerprint A exists in the fingerprint table. When no fingerprint entry in the fingerprint table includes the fingerprint A, the controller creates a new fingerprint entry in the fingerprint table and inserts the fingerprint A into the new fingerprint entry. The controller allocates an extent from the storage resource pool 1 to the first data, that is, allocates a storage address SD 1, stores the first data at the SD 1, and establishes a mapping relationship between the LBA 1 and the SD 1, as shown in FIG. 4. That is, the LBA 1 in the LUN 2 points to the SD 1. Optionally, the mapping relationship may further carry an identifier indicating whether the data is referenceable data. For example, 0 is used to identify non-referenceable data, and 1 is used to identify referenceable data. In this embodiment of the present invention, referenceable data is data that is stored at a storage address in a fingerprint entry in the fingerprint table, and non-referenceable data is data that is stored in the storage system but that is not stored at a storage address recorded in a fingerprint entry in the fingerprint table. The controller can easily identify that the data stored at the SD 1 is not referenceable data by a referenceable-data identifier in the mapping relationship between the LBA 1 and the SD 1.

Figure 5:
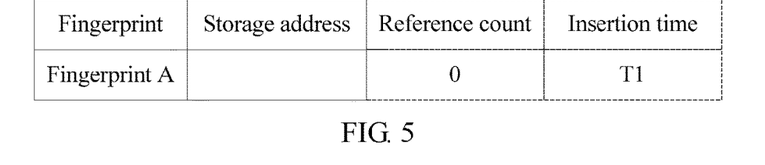
FIG. 5 is a schematic diagram of a fingerprint entry according to an embodiment of the present invention.

In the prior art, when the first data is data that is written for the first time, after the fingerprint A is inserted into the fingerprint table, a mapping relationship between the fingerprint A and the storage address SD 1 is established in the fingerprint table. However, in this embodiment of the present invention, as shown in FIG. 5, when the first data is data that is written for the first time, after the controller inserts the fingerprint A into the new fingerprint entry, the fingerprint A corresponds to no storage address in the new fingerprint entry, that is, the first storage address is not inserted into the new fingerprint entry. In this embodiment of the present invention, optionally, a fingerprint entry in the fingerprint table may further include time when a fingerprint is inserted and a quantity of times that a logical block address references a storage address in the fingerprint entry. The quantity of times that a logical block address references a storage address in the fingerprint entry is also referred to as a quantity of reference times of a storage address corresponding to a fingerprint in the fingerprint entry.

The quantity of times that a logical block address references a storage address in the fingerprint entry is determined by a mapping relationship between the logical block address and the storage address. When the controller establishes the mapping relationship between the logical block address and the storage address and the storage address is recorded in the fingerprint table, the logical block address references the storage address in the fingerprint entry once.

In this embodiment of the present invention, time when the fingerprint A is inserted is T1. Because there is only the fingerprint A in the new fingerprint entry, and the fingerprint A corresponds to no storage address, a quantity of times that the logical block address references the data at the storage address is 0. When a fingerprint entry includes a fingerprint but includes no storage address corresponding to the fingerprint, it indicates that the storage system has no referenceable data corresponding to the fingerprint. Based on this, the controller may delete, from the fingerprint table, a fingerprint that exists in the fingerprint table for duration exceeding preset duration and that corresponds to no storage address, and this reduces an amount of data in the fingerprint table. Specifically, in this embodiment of the present invention, the time when the fingerprint A is inserted is T1, and at a moment T2, the controller needs to delete a fingerprint that exists in the fingerprint table for duration exceeding the preset duration and that corresponds to no storage address. Duration for which the fingerprint A exists in the fingerprint table, that is, duration from the moment T1 to the moment T2, may be determined according to a difference between T2 and T1. When the fingerprint A in the fingerprint entry in the fingerprint table corresponds to no storage address and the different between T2 and T1 exceeds the preset duration, the fingerprint A may be deleted from the fingerprint table.

Generally, in deduplication, a fingerprint table is also referred to as a fingerprint index or fingerprint metadata, and is used to store a mapping relationship between a fingerprint and a storage address corresponding to the fingerprint. A data block corresponding to the fingerprint is stored at the storage address. In a specific implementation, a fingerprint entry may be used to store the mapping relationship between a fingerprint and a storage address corresponding to the fingerprint.

In this embodiment of the present invention, that no storage address corresponding to the fingerprint A exists means: the storage address corresponding to the fingerprint A is not defined in the fingerprint table or the fingerprint A corresponds to no storage address. In an implementation of a fingerprint entry to record the mapping relationship between a fingerprint and a storage address, a storage address may not be defined in the new fingerprint entry, that is, a storage address parameter may not be defined in the new fingerprint entry; or there is no storage address, that is, the storage address parameter is defined with Null.

Figure 6:
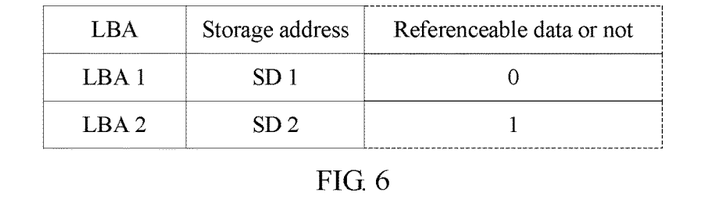
FIG. 6 is a schematic diagram of a mapping relationship between a logical block address and a storage address according to an embodiment of the present invention.
Figure 7:
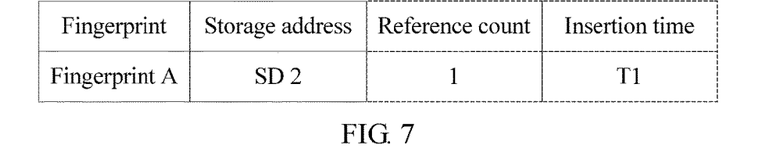
FIG. 7 is a schematic diagram of a fingerprint entry according to an embodiment of the present invention.

When the controller receives a second write request, the second write request generally carries the identifier of the LUN 2, an LBA 2, and second data. The LBA 2 is a target logical block address of the second data. The controller obtains the fingerprint A of the second data, for example, obtains the fingerprint A of the second data by a hash algorithm. The fingerprints of the first data and the second data are both the fingerprint A, and it indicates that the first data is the same as the second data. When querying the fingerprint table to determine that the fingerprint A corresponds to no storage address in the new fingerprint entry, the controller allocates an extent from the storage resource pool 2 to the second data, that is, allocates a storage address SD 2, stores the second data at the SD 2, and establishes a mapping relationship between the LBA 2 and the SD 2, as shown in FIG. 6. That is, the LBA 2 in the LUN 2 points to the SD 2. Optionally, the mapping relationship between the LBA 2 and the SD 2 may further carry an identifier indicating whether the data is referenceable data. For example, 1 is used to identify referenceable data. The controller can easily identify that the data stored at the SD 2 is referenceable data by a referenceable-data identifier in the mapping relationship between the LBA 2 and the SD 2. As shown in FIG. 7, the controller establishes a mapping relationship between the fingerprint A and the SD 2 in the new fingerprint entry, that is, the storage address corresponding to the fingerprint A inserted into the fingerprint entry is the SD 2. As shown in FIG. 7, the second data is referenceable data, and a quantity of reference times in the new fingerprint entry is updated to 1.

The controller counts a quantity of times that a received write request carries data whose fingerprint value is fingerprint A. When the quantity of times is greater than a preset quantity N of times, the controller allocates the SD 2 from the storage resource pool 2 to the second data, and inserts the SD 2 into the new fingerprint entry. N is an integer not less than 1, and specifically, may be set according to a requirement of the storage system. Therefore, according to the requirement of the storage system, when a quantity of times that data received by the controller carries a same fingerprint is greater than N, duplicate data appearing for the $(N+1)^{th}$ time is stored at the SD 2, and the SD 2 is inserted into the fingerprint entry. That is, the controller performs deduplication only on same data that has been received for multiple times, and this reduces an amount of data in the fingerprint table.

In this embodiment of the present invention, the controller stores a data block that is written for the first time at the first storage address and inserts a fingerprint of the data block that is written for the first time into a new fingerprint entry created in the fingerprint table, but does not insert a storage address at which the data block is stored. When receiving a subsequently written duplicate data block, the controller allocates a second storage address to the duplicate data block, stores the duplicate data block at the second storage address, and inserts the second storage address into a corresponding fingerprint entry in the fingerprint table. That is, the controller performs deduplication only on same data that has been received for multiple times, and this reduces the amount of the data in the fingerprint table. Further, the controller stores the referenceable data at a storage address of the storage area 2. Because storage performance of the storage area 2 is better than storage performance of the storage area 1, performance of the controller in accessing the referenceable data can be improved.

Figure 9:
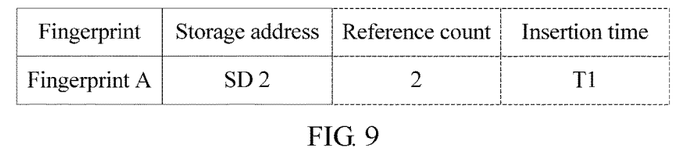
FIG. 9 is a schematic diagram of a fingerprint entry according to an embodiment of the present invention.

When the controller receives a third write request, the third write request generally carries the identifier of the LUN 2, an LBA 3, and third data. The LBA 3 is a target logical block address of the third data. The controller obtains the fingerprint A of the third data, for example, obtains the fingerprint A of the third data by a hash algorithm. The fingerprints of the first data, the second data, and the third data are all the fingerprint A, and it indicates that the first data, the second data, and the third data are identical. When querying the new fingerprint entry according to the fingerprint A to determine that the storage address corresponding to the fingerprint A is the SD 2, the controller establishes a mapping relationship between the LBA 3 and the SD 2, as shown in FIG. 6. That is, the LBA 3 in the LUN 2 points to the SD 2, and the third data is not stored. Based on this, the controller performs a deduplication operation on duplicate data, and storage space can be saved. Optionally, the mapping relationship between the LBA 3 and the SD 2 may further carry an identifier indicating whether the data is referenceable data. For example, 1 is used to identify referenceable data. The controller can easily identify that the data stored at the SD 2 is referenceable data by ua referenceable-data identifier in the mapping relationship between the LBA 3 and the SD 2. As shown in FIG. 9, the controller updates the quantity of reference times in the new fingerprint entry to 2.

Figure 10:
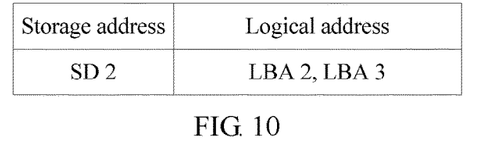
FIG. 10 is a schematic structural diagram of an inverse mapping table according to an embodiment of the present invention.

Optionally, this embodiment of the present invention further provides an inverse mapping table. As shown in FIG. 10, an entry in the inverse mapping table is used to record a mapping relationship between a storage address in an entry in the fingerprint table and a logical block address pointing to the storage address. For example, for the SD 2 corresponding to the fingerprint A, logical block addresses pointing to the SD 2 are respectively the LBA 2 and the LBA 3; therefore, the entry in the inverse mapping table shown in FIG. 10 records the mapping relationships between the SD 2 and both of the LBA 2 and the LBA 3. When the SSD providing the storage area 2 is faulty, a new SSD replaces the faulty SSD. If the SD 2 is provided by the faulty SSD, when the SD 2 is reallocated from the new SSD, the LBA 2 and the LBA 3 that are corresponding to the SD 2 can be determined only by querying the entry in the inverse mapping table shown in FIG. 10 and data of the LBA 2 and the LBA 3 may be recovered at the SD 2 provided by the new SSD, and there is no need to determine the logical block address pointing to the SD 2 (in other words, the logical block address corresponding to the SD 2) by traversing mapping relationships between logical block addresses of all LUNs in the storage system and storage addresses. Therefore, logical block address search efficiency during data recovery is improved.

Figure 11:
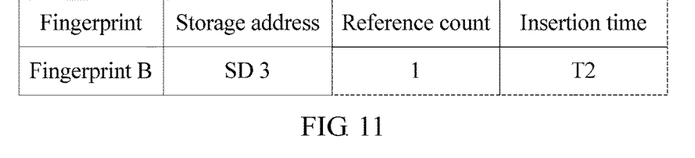
FIG. 11 is a schematic diagram of a fingerprint entry according to an embodiment of the present invention.
Figure 12:
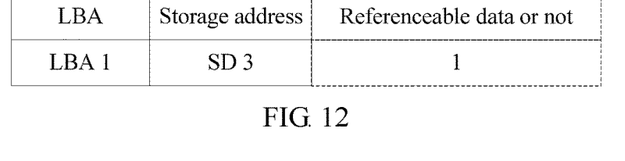
FIG. 12 is a schematic diagram of a mapping relationship between a logical block address and a storage address according to an embodiment of the present invention.

When the first write request is a modification/write request, that is, before the first data is written, a data block M has been written at the LBA 1, and a fingerprint corresponding to the data block M is a fingerprint B. A fingerprint entry in the fingerprint table includes information shown in FIG. 11:

A storage address that stores the data block M is an SD 3 in the storage area 2, and a quantity of reference times is 1. A mapping relationship between the LBA 1 and the storage address SD 3 is shown in FIG. 12: A storage address to which the LBA 1 points is the SD 3, and data stored at the SD 3 is referenceable data. When storing the first data at the SD 1 according to the first write request, the controller updates the mapping relationship shown in FIG. 12 to the mapping relationship shown in FIG. 4; the controller updates the quantity of reference times in the fingerprint entry shown in FIG. 11, that is, reduces the quantity of reference times to 0; and then the controller may directly delete the mapping relationship between the LBA 1 and the SD 3 or invalidate the mapping relationship, and release the storage address SD 3, so that the SD 3 becomes an idle storage address in the storage area 2, that is, the SD 3 is a storage address that is not allocated. Deleting the mapping relationship between the LBA 1 and the SD 3 is totally deleting the mapping relationship. A specific implementation of invalidating the mapping relationship may be using an invalid identifier to identify the mapping relationship, and the invalid identifier indicates that the mapping relationship is invalid.

When the deduplication logic of the controller is offline, the controller writes the first data at the SD 1 according to the first write request (the controller allocates a storage address from the storage area 1 to the data), and establishes the mapping relationship between the LBA 1 and the SD 1. When a mapping relationship between the LBA 1 and a storage address is shown in FIG. 12, that is, the storage address corresponding to the LBA 1 is the SD 3 and the data stored at the SD 3 is referenceable data, the controller records a quantity decrease of reference times of the SD 3 in a log. After the deduplication logic of the controller is online, according to the record of the quantity decrease of reference times of the SD 3 in the log, the controller updates the quantity of reference times in the fingerprint entry shown in FIG. 11, that is, reduces a reference count to 0. In this embodiment of the present invention, that the deduplication logic of the controller is offline means: a deduplication function of the controller is disabled or faulty, and that the deduplication logic of the controller is online means: the deduplication function of the controller is in a working state. According to aspects described in this embodiment of the present invention, when the controller does not perform deduplication, the controller may still access data stored in the storage device, write data, and delete data from the storage device according to the mapping relationship between the logical block address and the storage address. Therefore, data accessibility of the storage system is improved. In this embodiment of the present invention, scenarios in which the controller does not perform deduplication may include a scenario in which the deduplication logic of the controller is offline, a scenario in which the controller cannot access an entry in the fingerprint table, and the like.

Figure 8:
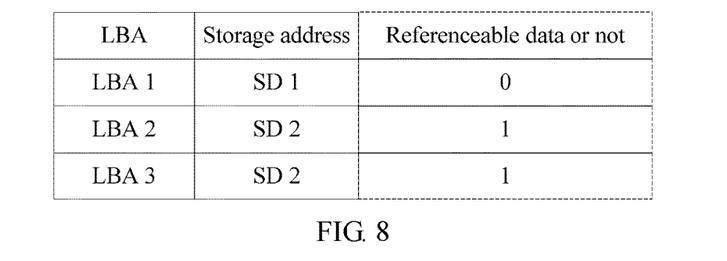
FIG. 8 is a schematic diagram of a mapping relationship between a logical block address and a storage address according to an embodiment of the present invention.

Further, in this embodiment of the present invention, the controller receives a fourth deletion request, and the fourth deletion request generally carries the identifier of the LUN 2 and the LBA 3. The controller queries, according to the LBA 3, the mapping relationship shown in FIG. 8, and invalidates or deletes the mapping relationship between the LBA 3 and the SD 2 shown in FIG. 8. Deleting the mapping relationship between the LBA 3 and the SD 2 is totally deleting the mapping relationship. A specific implementation of invalidating the mapping relationship between the LBA 3 and the SD 2 may be using an invalid identifier to identify the mapping relationship, and the invalid identifier indicates that the mapping relationship is invalid.

Because the LBA 3 no longer points to the SD 2, the quantity of reference times in the fingerprint entry shown in FIG. 9 is reduced by 1, that is, is updated to 1. When the controller deletes or invalidates the mapping relationship shown in FIG. 8 according to the fourth deletion request but the deduplication logic of the controller is offline, the controller records a quantity decrease of reference times of the SD 2 in a log. After the deduplication logic of the controller is online, according to the record of the quantity decrease of reference times of the SD 2 in the log, the controller updates the quantity of reference times in the fingerprint entry shown in FIG. 9, that is, reduces a reference count to 1.

The solution described in this embodiment of the present invention is also applicable to the LUN 1. That is, storage addresses are allocated from a same storage area. Optionally, the solution described in this embodiment of the present invention is not only applicable to an operation request of one LUN, but also applicable to operation requests of multiple LUNs. This is not limited in the present invention. In this embodiment of the present invention, another storage address allocation manner may further be used based on the storage system shown in FIG. 1. For example, a storage address is directly provided for a LUN from a hard disk based on the RAID algorithm. This is not limited in the present invention.

Further, in this embodiment of the present invention, a fingerprint entry whose quantity of reference times is greater than a preset threshold may be stored in a cache of the controller according to a quantity of reference times recorded in the fingerprint entry in the fingerprint table, so as to improve fingerprint search efficiency during deduplication.

Figure 13:
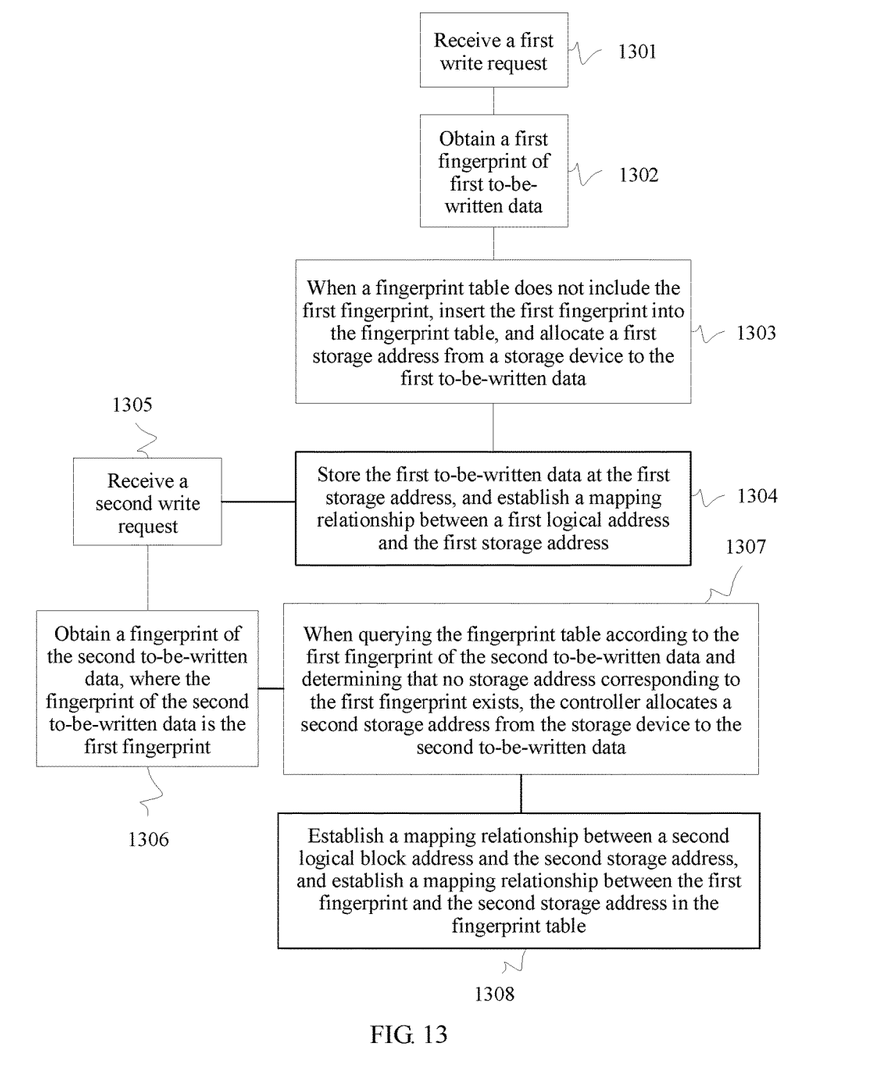
FIG. 13 is a flowchart according to an embodiment of the present invention.

With reference to FIG. 1 to FIG. 3 and the storage system described in the foregoing embodiment, FIG. 13 provides a flowchart of an embodiment of a method for deduplication in a storage system of the present invention.

Operation 1301: A controller receives a first write request, where the first write request carries a first logical block address and first data.

Operation 1302: The controller obtains a first fingerprint of the first data.

As described in the foregoing embodiment, the controller may obtain the first fingerprint by performing calculation on the first data according to a hash algorithm or the like.

Operation 1303: When a fingerprint table does not include the first fingerprint, the controller inserts the first fingerprint into the fingerprint table, and allocates a first storage address from a storage device to the first data.

In a specific implementation, when a fingerprint entry is used to record a mapping relationship between a fingerprint and a storage address and no fingerprint entry in the fingerprint table includes the first fingerprint, the controller creates a first fingerprint entry in the fingerprint table, and inserts the first fingerprint into the first fingerprint entry.

Operation 1304: The controller stores the first data at the first storage address, and establishes a mapping relationship between the first logical block address and the first storage address.

Optionally, the controller records, in the fingerprint table, time when the first fingerprint is inserted. Specifically, the controller records, in the first fingerprint entry, the time when the first fingerprint is inserted.

When the fingerprint table does not include the first fingerprint, the controller inserts the first fingerprint into the fingerprint table, but no storage address corresponding to the first fingerprint exists. Therefore, the first data stored at the first storage address is not referenceable data. In a specific implementation, that no storage address corresponding to the first fingerprint exists in the fingerprint table may mean: the storage address corresponding to the first fingerprint is not defined in the fingerprint table or the first fingerprint corresponds to no storage address. In an implementation of using the fingerprint entry to record the mapping relationship between a fingerprint and a storage address, when no fingerprint entry in the fingerprint table includes the first fingerprint, the controller creates the first fingerprint entry in the fingerprint table; when the first fingerprint is inserted into the first fingerprint entry, the storage address may not be defined in the first fingerprint entry, that is, a storage address parameter may not be defined in the first fingerprint entry; or there is no storage address, that is, the storage address parameter is defined with Null. These cases indicate that no storage address corresponding to the first fingerprint exists in the fingerprint table, that is, a mapping relationship between the first fingerprint and the first storage address is not established in the fingerprint table.

Operation 1305: The controller receives a second write request, where the second write request carries a second logical block address and second data.

Operation 1306: The controller obtains a fingerprint of the second data, where the fingerprint of the second data is the first fingerprint.

As described in the foregoing embodiment, the controller may obtain the first fingerprint by performing calculation on the second data according to a hash algorithm or the like. The fingerprints of the first data and the second data are the same, and it indicates that the first data is the same as the second data.

Operation 1307: When the controller queries the fingerprint table according to the first fingerprint of the second data and determines that no storage address corresponding to the first fingerprint exists, the controller allocates a second storage address from the storage device to the second data.

Operation 1308: The controller establishes a mapping relationship between the second logical block address and the second storage address, and establishes a mapping relationship between the first fingerprint and the second storage address in the fingerprint table.

Optionally, the controller allocates the first storage address from a first storage area of the storage device to the first data, and the controller allocates the second storage address from a second storage area of the storage device to the second data, where storage performance of the second storage area is higher than storage performance of the first storage area, and performance of the controller in accessing referenceable data can be improved.

Optionally, the controller records a quantity of reference times of the second storage address in the fingerprint table. In a specific implementation, the controller may record the quantity of reference times of the second storage address in the first fingerprint entry in the fingerprint table. A quantity of reference times is a quantity of times that a logical block address references a storage address corresponding to a fingerprint in the fingerprint table. The quantity of times that a logical block address references a storage address corresponding to a fingerprint in the fingerprint table is determined by a mapping relationship between the logical block address and the storage address. When the controller establishes the mapping relationship between the logical block address and the storage address, and the storage address is recorded in the fingerprint table, the logical block address references the storage address corresponding to the fingerprint in the fingerprint table once. In a specific implementation, the controller records the quantity of reference times of the second storage address in the first fingerprint entry in the fingerprint table, and the quantity of reference times is a quantity of times that the logical block address references a storage address in the fingerprint entry. It may be determined, according to the quantity of reference times, whether data can be written at the second storage address again. When the quantity of reference times is 0, it indicates that no logical block address points to the second storage address, and the second storage address may be released, so that the second storage address becomes an idle storage address in the storage device and may be used for writing data again. The controller stores, in a cache of the controller according to a quantity of reference times recorded in the fingerprint table, a mapping relationship between a fingerprint whose quantity of reference times is greater than a preset threshold and a storage address corresponding to the fingerprint, and this improves fingerprint search efficiency during deduplication.

The controller counts a quantity of times that a received write request carries data whose fingerprint value is the first fingerprint. When the quantity of times is greater than a preset quantity N of times, the controller stores the second data at the second storage address, and establishes the mapping relationship between the first fingerprint and the second storage address in the fingerprint table, where N is an integer not less than 1. That is, duplicate data (the second data) appearing for the $(N+1)^{th}$ time is stored at the second storage address, and the mapping relationship between the first fingerprint and the second storage address is established in the fingerprint table. Data stored at the second storage address is referenceable data. As described above, a specific implementation of establishing, by the controller, the mapping relationship between the first fingerprint and the second storage address in the fingerprint table may be specifically inserting, by the controller, the second storage address into the first fingerprint entry in the fingerprint table. Therefore, deduplication on a data block whose duplication degree reaches a specific value may be set according to a requirement of the storage system. Referenceable data is data that is stored at a storage address corresponding to a fingerprint in the fingerprint table, and non-referenceable data is data that is stored in the storage system but that is not stored at a storage address corresponding to a fingerprint in the fingerprint table. In a specific implementation, referenceable data is data that is stored at a storage address in a fingerprint entry in the fingerprint table, and non-referenceable data is data that is stored in the storage system but that is not stored at a storage address recorded in a fingerprint entry in the fingerprint table.

The controller establishes the mapping relationship between the first fingerprint and the second storage address in the fingerprint table; therefore, the second data stored at the second storage address is referenceable data.

Optionally, the controller receives a third write request, where the third write request carries a third logical block address and third data; the controller obtains a fingerprint of the third data, where the fingerprint of the third data is the first fingerprint; and when querying the fingerprint table according to the first fingerprint of the third data to determine that a storage address corresponding to the first fingerprint is the second storage address, the controller establishes a mapping relationship between the third logical block address and the second storage address. The fingerprints of the first data, the second data, and the third data are all the first fingerprint, and it indicates that the first data, the second data, and the third data are identical. Based on this, the controller performs a deduplication operation on duplicate data, and storage space can be saved. In a specific implementation, when querying the first fingerprint entry in the fingerprint table according to the first fingerprint of the third data to determine that the storage address corresponding to the first fingerprint is the second storage address, the controller establishes the mapping relationship between the third logical block address and the second storage address.

Optionally, the controller deletes a second fingerprint from the fingerprint table. No storage address corresponding to the second fingerprint exists, and duration for which the second fingerprint exists in the fingerprint table exceeds preset duration, and this further reduces an amount of data in the fingerprint table. In a specific implementation, it may be determined, according to time when the second fingerprint is inserted and that is recorded in the fingerprint table, that the duration for which the second fingerprint exists in the fingerprint table exceeds the preset duration. Optionally, a fingerprint entry is used as an example. For the second fingerprint recorded in a fingerprint entry by the controller, the second fingerprint corresponds to no storage address in a second fingerprint entry, and duration for which the second fingerprint exists in the second fingerprint entry exceeds the preset duration.

Optionally, the storage system further includes an inverse mapping table. An entry in the inverse mapping table is used to record a mapping relationship between a storage address corresponding to a fingerprint in the fingerprint table and a logical block address pointing to the storage address. For the second storage address corresponding to the first fingerprint, logical block addresses pointing to the second storage address are respectively the second logical block address and the third logical block address. When the second storage address provided by the storage device is faulty (or the second storage area is faulty), the faulty storage device is replaced with a new storage device (the faulty second storage area is replaced with a new storage area). Therefore, when the second storage address is reallocated from the new storage device or the new storage area, the second logical block address and the third logical block address that are corresponding to the second storage address only need to be determined according to an entry in the inverse mapping table, and there is no need to determine the logical block addresses pointing to the second storage address by traversing mapping relationships between logical block addresses of all logical units in the storage system and storage addresses. Therefore, logical block address search efficiency during data recovery is improved.

Optionally, a mapping relationship between a logical block address and a storage address may further include an identifier indicating whether data is referenceable data. For example, the mapping relationship between the first logical block address and the first storage address carries an identifier indicating whether the data is referenceable data, the mapping relationship between the second logical block address and the second storage address carries an identifier indicating whether the data is referenceable data, and the mapping relationship between the third logical block address and the second storage address carries an identifier indicating whether the data is referenceable data. The controller may easily identify whether the data stored at the storage addresses is referenceable data by using referenceable-data identifiers in the foregoing mapping relationships.

According to the flowchart shown in FIG. 13, the fingerprints of the first data and the second data are both the first fingerprint, and it indicates that the first data is the same as the second data. The controller stores a data block that is written for the first time at the first storage address and inserts, into the fingerprint table, the first fingerprint of the first data that is written for the first time, but does not establish the mapping relationship between the first fingerprint and the first storage address. When receiving the subsequently written second data (the second data is not limited to same data received by the controller for the second time), the controller allocates the second storage address to the duplicate second data, stores the second data at the second storage address, and establishes the mapping relationship between the first fingerprint and the second storage address in the fingerprint table. That is, the controller performs deduplication only on same data that has been received for multiple times, and this reduces the amount of the data in the fingerprint table.

For a specific implementation of the flowchart shown in FIG. 13, refer to the description in the foregoing embodiment, and details are not described herein again.

Figure 14:
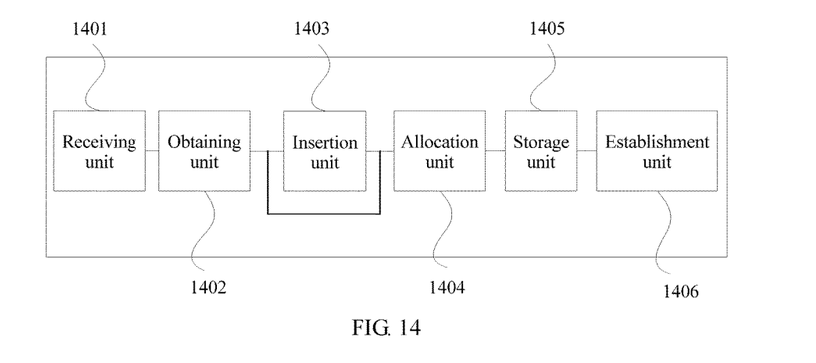
FIG. 14 is a schematic structural diagram of a controller according to an embodiment of the present invention.

According to the solutions described in the embodiments of the present invention, another embodiment of the present invention provides a controller shown in FIG. 14, applied to a storage system in the embodiments of the present invention. The controller includes a receiving unit 1401, an obtaining unit 1402, an insertion unit 1403, an allocation unit 1404, a storage unit 1405, and an establishment unit 1406. The receiving unit 1401 is configured to receive a first write request, where the first write request carries a first logical block address and first data. The obtaining unit 1402 is configured to obtain a first fingerprint of the first data. The insertion unit 1403 is configured to: insert the first fingerprint into the fingerprint table when a fingerprint table does not include the first fingerprint. The allocation unit 1404 is configured to allocate a first storage address from a storage device to the first data. The storage unit 1405 is configured to store the first data at the first storage address. The establishment unit 1406 is configured to establish a mapping relationship between the first logical block address and the first storage address. The receiving unit 1401 is further configured to receive a second write request, where the second write request carries a second logical block address and second data. The obtaining unit 1402 is further configured to obtain a fingerprint of the second data, where the fingerprint of the second data is the first fingerprint. The allocation unit 1404 is further configured to: allocate a second storage address from the storage device to the second data when querying the fingerprint table according to the first fingerprint of the second data to determine that no storage address corresponding to the first fingerprint exists in the fingerprint table. The storage unit 1405 is further configured to store the second data at the second storage address. The establishment unit 1406 is further configured to establish a mapping relationship between the second logical block address and the second storage address, and establish a mapping relationship between the first fingerprint and the second storage address in the fingerprint table.

Optionally, the allocation unit 1404 is specifically configured to allocate the first storage address from a first storage area of the storage device to the first data, and allocate the second storage address from a second storage area of the storage device to the second data. Storage performance of the second storage area is higher than storage performance of the first storage area.

Optionally, the receiving unit 1401 is further configured to receive a third write request, where the third write request carries a third logical block address and third data. The obtaining unit 1402 is further configured to obtain a fingerprint of the third data, where the fingerprint of the third data is the first fingerprint. The establishment unit 1406 is further configured to: establish a mapping relationship between the third logical block address and the second storage address when the fingerprint table is queried according to the first fingerprint of the third data to determine that a storage address corresponding to the first fingerprint is the second storage address.

Optionally, the controller further includes a record unit, and the record unit is configured to record a quantity of reference times of the second storage address in a first fingerprint entry. Optionally, the record unit is further configured to record the quantity of reference times of the second storage address in the fingerprint table.

Optionally, the controller further includes a deletion unit, and the deletion unit is configured to delete a second fingerprint from the fingerprint table. No storage address corresponding to the second fingerprint exists, and duration for which the second fingerprint exists in the fingerprint table exceeds preset duration.

Optionally, the controller further includes a counting unit, configured to count a quantity of times that a received write request carries data whose fingerprint value is the first fingerprint. the storage unit 1405 stores the second data at the second storage address, and the establishment unit 1406 establishes the mapping relationship between the first fingerprint and the second storage address in the fingerprint table when the quantity of times is greater than a preset quantity N of times, where N is an integer not less than 1.

For an effect implemented by the controller shown in FIG. 14 and for a further implementation, refer to the corresponding description in the foregoing embodiments, and details are not described herein again.

For the controller shown in FIG. 14, an implementation is that the foregoing units are installed in the controller, the foregoing units may be loaded in a memory of the controller, and a CPU in the controller executes an instruction in the memory, so as to implement functions in the corresponding embodiments of the present invention; another implementation is that the units included in the controller may be implemented by hardware, or implemented by a combination of hardware and the instruction in the memory executed by the CPU. The foregoing units are also referred to as structural units.

An embodiment of the present invention further provides a non-volatile computer readable storage medium and a computer program product, and a computer instruction included in the non-volatile computer readable storage medium and the computer program product. A CPU executes the computer instruction loaded in a memory, so as to implement functions corresponding to the controller in the embodiments of the present invention.

According to aspects described in the embodiments of the present invention, when the controller cannot access an entry in a fingerprint table, the controller can still access data in the storage device, write data, and delete data from the storage device according to a mapping relationship between a logical block address and a storage address.

In the embodiments of the present invention, a fingerprint entry in the fingerprint table and the mapping relationship between a logical block address and a storage address may be data structures or other proper descriptive structures, and are used to record corresponding information. An example description is given in the embodiments of the present invention. "First", "second", "third", and "fourth" in the embodiments of the present invention are not used to strictly limit a sequence. For example, when used to represent an operation request, "first", "second", and "third" are used to only distinguish between different operation requests, and when used to represent data, "first", "second", and "third" are used to only represent data carried in different write requests. The controller may further receive one or more write requests between the first write request and the second write request. Storage performance in the embodiments of the present invention may be measured by one or more indicators, such as bandwidth, input/output operations per second (TOPS), a sequential read/write speed, a random read/write speed, a sustained throughput (Sustained Throughput) capability, and a burst processing capability (Burst I/O), and the embodiments of the present invention sets no limitation thereto.

In the several embodiments provided in the present invention, it should be understood that the disclosed apparatus and method may be implemented in other manners. For example, the unit division in the described apparatus embodiment is merely logical function division and may be another division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

What is claimed is:

1. A method for data deduplication in a storage system, wherein the storage system comprises a controller and a storage device, and the method comprising:
   receiving, by the controller, a first write request, wherein the first write request includes a first logical block address and first data to be written in the storage system;
   obtaining, by the controller, a first fingerprint of the first data;
   inserting, by the controller, the first fingerprint into a fingerprint table when the fingerprint table does not contain the first fingerprint, and allocating a first storage address from the storage device to the first data; wherein there is no storage address corresponding to the first fingerprint in the fingerprint table;
   storing, by the controller, the first data at the first storage address of the storage device;
   establishing, by the controller, a mapping relationship between the first logical block address and the first storage address;

receiving, by the controller, a second write request, wherein the second write request includes a second logical block address and second data to be written;

obtaining, by the controller, a second fingerprint of the second data, wherein the second fingerprint of the second data is identical to the first fingerprint;

allocating, by the controller, a second storage address from the storage device to the second data when the controller queries the fingerprint table according to the second fingerprint of the second data and determines that no storage address corresponding to the first fingerprint exists;

storing, by the controller, the second data at the second storage address;

establishing, by the controller, a mapping relationship between the first fingerprint and the second storage address in the fingerprint table; and establishing, by the controller, a mapping relationship between the second logical block address and the second storage address.

2. The method according to claim 1, wherein allocating, by the controller, a first storage address from the storage device to the first data comprises: allocating, by the controller, the first storage address from a first storage area of the storage device to the first data; and allocating, by the controller, a second storage address from the storage device to the second data comprises: allocating, by the controller, the second storage address from a second storage area of the storage device to the second data, wherein storage performance of the second storage area is higher than storage performance of the first storage area.

3. The method according to claim 1, further comprising:
receiving, by the controller, a third write request, wherein the third write request includes a third logical block address and third data to be written;
obtaining, by the controller, a third fingerprint of the third data, wherein the fingerprint of the third data is identical to the first fingerprint; and
establishing, by the controller, a mapping relationship between the third logical block address and the second storage address when querying the fingerprint table according to the third fingerprint of the third data determines that a storage address corresponding to the first fingerprint is identical to the second storage address.

4. The method according to claim 1, further comprising:
recording, by the controller, a quantity of reference times of the second storage address in the fingerprint table.

5. The method according to claim 1, further comprising:
recording, by the controller in the fingerprint table, time when the first fingerprint is inserted.

6. The method according to claim 5, further comprising:
deleting, by the controller, a fourth fingerprint from the fingerprint table, in response to determining that no storage address corresponding to the fourth fingerprint exists, and duration for which the fourth fingerprint exists in the fingerprint table exceeds preset duration.

7. The method according to claim 1, further comprising:
counting, by the controller, a quantity of times that a received write request includes data to be written whose fingerprint is identical to the first fingerprint, storing, by the controller, the second data at the second storage address, and establishing the mapping relationship between the first fingerprint and the second storage address in the fingerprint table when the quantity of times is greater than a preset quantity N of times, wherein N is an integer not less than 1.

8. A storage system, comprising:
a controller; and
a storage device, wherein the controller is configured to:
receive a first write request having a first logical block address and first data to be written;
obtain a first fingerprint of the first data;
insert the first fingerprint into a fingerprint table when the fingerprint table does not contain the first fingerprint, and allocate a first storage address from the storage device to the first data; wherein there is no storage address corresponding to the first fingerprint in the fingerprint table;
store the first data at the first storage address of the storage device; and
establish a mapping relationship between the first logical block address and the first storage address;
wherein the controller is further configured to:
receive a second write request having a second logical block address and second data to-be-written;
obtain a second fingerprint of the second data, wherein the second fingerprint of the second data is identical to the first fingerprint;
allocate a second storage address from the storage device to the second data when querying the fingerprint table according to the second fingerprint of the second data determines that no storage address corresponding to the first fingerprint exists;
store the second data at the second storage address;
establish a mapping relationship between the second logical block address and the second storage address; and
establish a mapping relationship between the first fingerprint and the second storage address in the fingerprint table; and
wherein the storage device is configured to provide the first storage address and the second storage address.

9. The storage system according to claim 8, wherein the controller is configured to allocate the first storage address from a first storage area of the storage device to the first data and allocate the second storage address from a second storage area of the storage device to the second data, wherein storage performance of the second storage area is higher than storage performance of the first storage area.

10. The storage system according to claim 8, wherein the controller is further configured to:
receive a third write request having a third logical block address and third data to-be-written;
obtain a third fingerprint of the third data, wherein the third fingerprint of the third data is identical to the first fingerprint;
establish a mapping relationship between the third logical block address and the second storage address when querying the fingerprint table according to the third fingerprint of the third data determines that a storage address corresponding to the first fingerprint is identical to the second storage address.

11. The storage system according to claim 8, wherein the controller is further configured to record a quantity of reference times of the second storage address in the fingerprint table.

12. The storage system according to claim 8, wherein the controller is further configured to record, in the fingerprint table, time when the first fingerprint is inserted.

13. The storage system according to claim 12, wherein the controller is further configured to delete a fourth fingerprint, in response to determining that no storage address corresponding to the fourth fingerprint exists, and duration for which the fourth fingerprint exists in the fingerprint table exceeds preset duration.

14. The storage system according to claim 8, wherein the controller is further configured to:
   count a quantity of times that a received write request includes data to be written whose fingerprint value is identical to the first fingerprint, store the second data at the second storage address, and establish the mapping relationship between the first fingerprint and the second storage address in the fingerprint table when the quantity of times is greater than a preset quantity N of times,, wherein N is an integer not less than 1.

15. A controller applied to a storage system, wherein the storage system comprises the controller and a storage device, the controller comprising:
   an interface; and
   a processor communicatively coupled to the processor, wherein the interface is configured to receive a first write request having a first logical block address and first data to be written;
   wherein the processor is configured to:
      obtain a first fingerprint of the first data;
      insert the first fingerprint into a fingerprint table when the fingerprint table does not contain the first fingerprint, and allocate a first storage address from the storage device to the first data; wherein there is no storage address corresponding to the first fingerprint in the fingerprint table;
      store the first data at the first storage address; and
      establish a mapping relationship between the first logical block address and the first storage address;
   wherein the interface is further configured to receive a second write request having a second logical block address and second data to be written; and
   wherein the processor is further configured to:
      obtain a second fingerprint of the second data, wherein the second fingerprint of the second data is identical to the first fingerprint;
      allocate a second storage address from the storage device to the second data when querying the fingerprint table according to the second fingerprint of the second data determines that no storage address corresponding to the first fingerprint exists in the fingerprint table;
      store the second data at the second storage address;
      establish a mapping relationship between the second logical block address and the second storage address; and
      establish a mapping relationship between the first fingerprint and the second storage address in the fingerprint table.

16. The controller according to claim 15, wherein the processor is configured to allocate the first storage address from a first storage area of the storage device to the first data and allocate the second storage address from a second storage area of the storage device to the second data, wherein storage performance of the second storage area is higher than storage performance of the first storage area.

17. The controller according to claim 15, wherein the interface is further configured to receive a third write request having a third logical block address and third data to be written; and
   the processor is further configured to:
      obtain a third fingerprint of the third data, wherein the third fingerprint of the third data is identical to the first fingerprint; and
      establish a mapping relationship between the third logical block address and the second storage address when querying the fingerprint table according to the third fingerprint of the third data determines that a storage address corresponding to the first fingerprint is identical to the second storage address.

18. The controller according to a claim 15, wherein the processor is further configured to record a quantity of reference times of the second storage address in the fingerprint table.

19. The controller according to claim 15, wherein the processor is further configured to record, in the fingerprint table, time when the first fingerprint is inserted.

20. The controller according to claim 19, wherein the processor is further configured to delete a fourth fingerprint from the fingerprint table, in response to determining that no storage address corresponding to the fourth fingerprint exists, and duration for which the fourth fingerprint exists in the fingerprint table exceeds preset duration.

21. The controller according to claim 15, wherein the processor is further configured to: count a quantity of times that a received write request includes data to be written whose fingerprint value is identical to the first fingerprint, store the second data at the second storage address, and establish the mapping relationship between the first fingerprint and the second storage address in the fingerprint table when the quantity of times is greater than a preset quantity N of times,, wherein N is an integer not less than 1.

* * * * *